(12) United States Patent
Whittaker et al.

(10) Patent No.: US 10,453,473 B2
(45) Date of Patent: Oct. 22, 2019

(54) NOISE-REDUCTION SYSTEM FOR UAVS

(71) Applicant: AIRSHARE, Inc., Ottawa, Ontario (CA)

(72) Inventors: Richard Jonathan Whittaker, Ottawa (CA); Tariq Sigouin, Ottawa (CA)

(73) Assignee: AirShare, Inc., Ottawa, Ontario (CA)

( * ) Notice: Subject to any disclaimer, the term of this patent is extended or adjusted under 35 U.S.C. 154(b) by 0 days.

(21) Appl. No.: 15/849,841

(22) Filed: Dec. 21, 2017

(65) Prior Publication Data

US 2018/0204585 A1    Jul. 19, 2018

Related U.S. Application Data

(60) Provisional application No. 62/438,021, filed on Dec. 22, 2016.

(51) Int. Cl.

| | |
|---|---|
| *G10L 21/0232* | (2013.01) |
| *G10L 25/51* | (2013.01) |
| *H04R 1/02* | (2006.01) |
| *G10K 11/00* | (2006.01) |
| *H04R 1/08* | (2006.01) |
| *B64C 39/02* | (2006.01) |
| *G10L 21/0208* | (2013.01) |
| *H04R 3/00* | (2006.01) |

(52) U.S. Cl.
CPC ........ *G10L 21/0232* (2013.01); *B64C 39/024* (2013.01); *G10K 11/002* (2013.01); *G10L 21/0208* (2013.01); *G10L 25/51* (2013.01); *H04R 1/028* (2013.01); *H04R 1/08* (2013.01); *H04R 3/00* (2013.01); *B64C 2201/027* (2013.01); *B64C 2201/108* (2013.01); *B64C 2201/141* (2013.01); *B64C 2201/146* (2013.01); *G10K 2200/10* (2013.01); *G10L 2021/02085* (2013.01); *H04R 2410/05* (2013.01); *H04R 2499/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,687,243 | A * | 11/1997 | McLaughlin | ........ H04B 14/046 381/94.3 |
| 5,774,837 | A * | 6/1998 | Yeldener | ................. G10L 19/12 704/206 |
| 9,715,884 | B2 * | 7/2017 | Kitazawa | ............ G10L 21/0208 |
| 9,738,381 | B1 * | 8/2017 | Loud | ..................... B64C 39/024 |
| 9,984,672 | B2 * | 5/2018 | Fong | ........................ H04R 3/04 |
| 2012/0190315 | A1 * | 7/2012 | Glezerman | .............. A42B 3/04 455/90.3 |
| 2016/0103202 | A1 * | 4/2016 | Sumiyoshi | ................ G01S 5/18 367/118 |
| 2016/0375997 | A1 * | 12/2016 | Welsh | ................... B64C 39/024 244/17.23 |
| 2017/0162215 | A1 * | 6/2017 | Jones | ...................... G10L 25/51 |

(Continued)

*Primary Examiner* — Duc Nguyen
*Assistant Examiner* — Assad Mohammed
(74) *Attorney, Agent, or Firm* — Teitelbaum bouevitch & McLachlen; Neil Teitelbaum

(57) ABSTRACT

An apparatus and method for reducing background noise captured by a UAV acoustic sensor are disclosed. The background noise may be reduced by incorporating a known UAV acoustic signature corresponding to a determined flight parameter into an adaptive filter coupled to the acoustic sensor.

18 Claims, 12 Drawing Sheets

(56) References Cited

U.S. PATENT DOCUMENTS

| | | |
|---|---|---|
| 2017/0168179 A1* | 6/2017 | Lemarenko ............ G01V 1/282 |
| 2017/0183074 A1* | 6/2017 | Hutson ................... B64C 1/061 |
| 2017/0274991 A1* | 9/2017 | Shiosaki ................. B64C 11/46 |
| 2017/0274993 A1* | 9/2017 | Beckman ............... B64C 39/024 |
| 2018/0075834 A1* | 3/2018 | Fong ........................ H04R 3/04 |
| 2018/0090134 A1* | 3/2018 | Miller ..................... G10L 13/02 |

* cited by examiner

```
main_loop () {
  f(x) = Sample_Lookup (&raw_loop, &op_state, &config[]) 
  h(x) = Sample_Align(f(x))
  f'(x) = f(x) * h(x) * a(x)
}
``` a(x)   f(x)   h(x)   f(x)

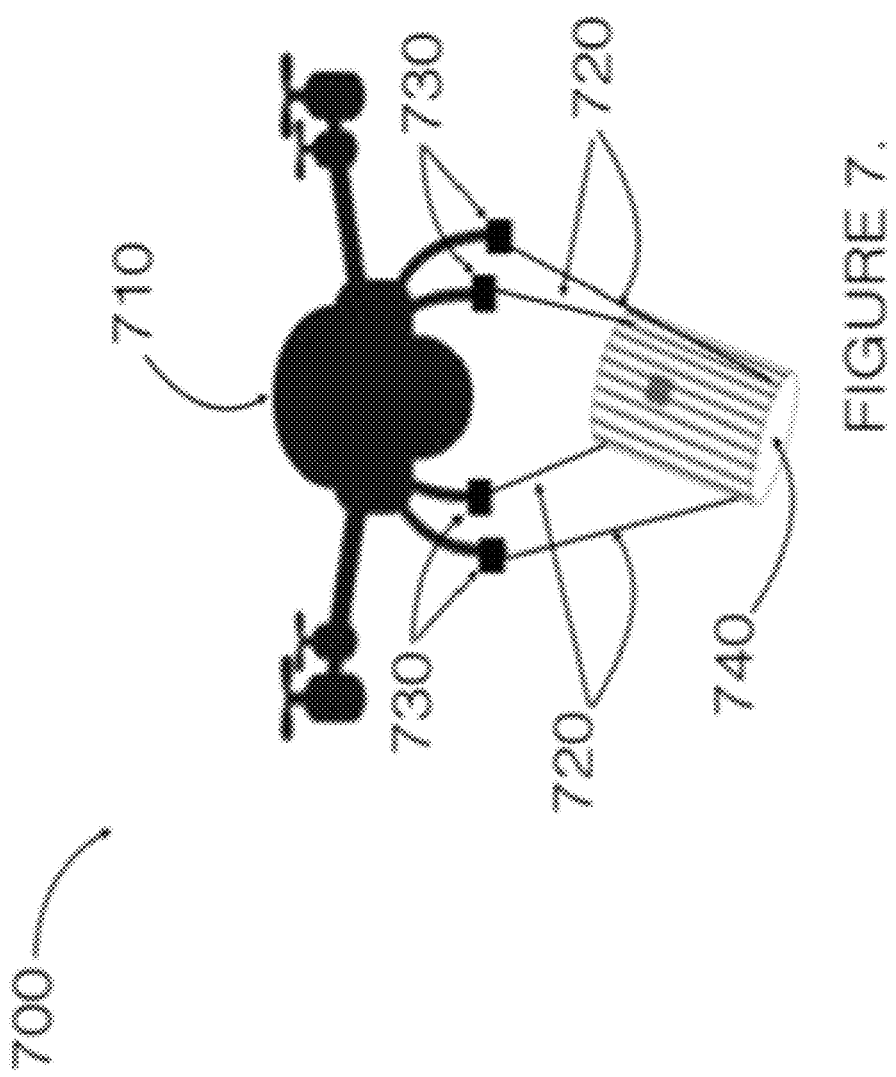

NOISE-REDUCTION SYSTEM FOR UAVS

REFERENCE TO RELATED APPLICATION

The present application claims priority from U.S. Provisional Application No. 62/438,021 filed on Dec. 22, 2016 and incorporated herein by reference in its entirety.

FIELD

The present application is related to acoustic noise suppression, and in particular, to mitigating undesirable acoustic noise in acoustic data collected by an unmanned aerial vehicle (UAV).

BACKGROUND

UAVs can be used for a variety of tasks, including surveillance, reconnaissance, photography, videography, emergency responding, delivery of articles, and other tasks. Various sensors may be placed on UAVs for remote data collection. The data may be stored in UAV memory or streamed to a user operating UAV in real time.

The use of UAVs for collecting audio data is hindered by acoustic interference from propellers, motors, and other static and dynamic operating components of the UAVs. Prior art solutions to reduce noise from these components are complex, leading to impractical costs, size, and, or weight. Prior art generally relates to active noise cancellation, such as the use of phased arrays of a plurality of microphone sources to measure and subtract ambient noise in real time.

By way of example, U.S. Patent Application 2016/0063987 A1 "UNMANNED AERIAL VEHICLE (UAV) FOR COLLECTING AUDIO DATA" describes a noise-cancellation system using at least two microphones and a relatively complex low-latency microprocessor to perform the active noise cancellation function.

The complexity of noise-cancellation systems of the prior art leads to increased manufacturing costs of UAV systems. Furthermore, required high clock speeds of microprocessors used by noise cancellation systems of the prior art may increase energy consumption of UAVs, which affects autonomous flight time and the range of flight of the UAVs.

SUMMARY

The present disclosure relates to a method and system for reducing background noise in signals captured by UAV-mounted acoustic sensors. The disclosed embodiments may enable a reduction in the cost, weight, size, and complexity of on-board sensors and computing systems while achieving generally acceptable noise reduction.

Accordingly, one aspect of the present disclosure encompasses the use of a relatively small set of acoustic data sensors. One embodiment can use only one microphone sensor to collect acoustic data. Further, a broad embodiment of the present invention may include the use of a collection of pre-recorded noise cancellation waveforms and pre-determined functions.

In one aspect, known flight conditions may be relied upon to reduce the processing burden on the adaptive filter used to suppress UAV related noise in detected audio signals. Noise cancellation parameters and related waveform sets can be selected from a pre-determined list based on actual flight conditions as identified during flight. Flight conditions may include rotor speeds, body and gimbal orientation, user flight inputs, position-compensation information, and other information that enables the selection of the appropriate noise filter. Physical configuration parameters (such as camera/lens selection, propeller type, payloads, body configuration, etc.) can also be used in some embodiments.

A physical acoustic shield apparatus may be provided to facilitate the suppression of propeller-generated noise in the vicinity of the UAV sensors. The shield can be made into a variety of shapes, including square, rectangular, cubic, and parabolic/dome-shaped. A preferred embodiment of the shield is a parabolic shape which encompasses sensors mounted under the UAV, such as ground proximity sensors, gimbals, cameras, acoustic sensors, etc. The shape of the shield enables an effective attenuation of acoustic signals with minimal induced moment or drag on the UAV flight performance characteristics. Further, the acoustic shield may be used as a landing gear and provide further weather protection for the sensitive equipment contained therein.

The acoustic shield may also be mounted onto a fixed or extendable boom. The boom may contain the acoustic and other sensors. By extending the boom, the sensors contained therein can be brought closer to be closer to the target signal and farther from the UAV self-noise source, thereby improving the signal to noise ratio.

In accordance with an embodiment of the present disclosure, there is provided a method for suppressing noise. The method includes obtaining a sound waveform corresponding to an acoustic signal captured by an unmanned aerial vehicle (UAV)-mounted acoustic sensor during flight, determining at least one flight parameter of the UAV, obtaining an acoustic noise signature in accordance with the at least one flight parameter from a database of acoustic signatures for flight parameters, and applying the acoustic noise signature to suppress acoustic noise in the sound waveform. The acoustic noise signature may be applied by first obtaining an approximation of noise in the sound waveform from the acoustic noise signature, and then subtracting the approximation of noise from the sound waveform. The approximation of noise may also take into account various flight parameters and conditions of the UAV.

In accordance with an embodiment of the present disclosure, there is provided an apparatus for suppressing noise comprising an acoustic sensor for mounting on an unmanned aerial vehicle (UAV), a processor, and a computer readable storage medium storing programming for execution by the processor. The programming may include instructions for obtaining a sound waveform corresponding to an acoustic signal captured by the UAV-mounted acoustic sensor during flight, determining at least one flight parameter of the UAV, obtaining an acoustic noise signature in accordance with the at least one flight parameter from a database of acoustic signatures for flight parameters, and applying the acoustic noise signature to suppress acoustic noise in the sound waveform to generate a noise-suppressed sound waveform.

In accordance with an embodiment of the present disclosure, there is further provided a UAV comprising a body, one or more rotational components each comprising a propeller for propelling the body through the air, a flight controller for controlling the one or more rotational components based on flight parameters, an acoustic sensor for capturing an acoustic signal, and a noise reduction processing unit configured for obtaining a sound waveform corresponding to an acoustic signal captured by the UAV-mounted acoustic sensor during flight, determining at least one flight parameter of the UAV, obtaining an acoustic noise signature in accordance with the at least one flight parameter from a database of acoustic signatures for flight parameters, and applying the acoustic noise signature to suppress acoustic noise in the sound waveform, thereby generating a noise-suppressed or noise-reduced sound waveform. An acoustic shield may be provided between the at least one rotational component and the acoustic sensor, which may be disposed on a boom. The boom may be extendable and retractable.

These and other aspects of the present disclosure will become apparent to one skilled in the art upon reading the following description of the preferred embodiments and the corresponding diagrams and descriptions in support of the stated claims. To those skilled in the art, it will be evident that the embodiments described herein may be varied to meet particular specialized requirements without departing from the spirit and scope of the present disclosure. These embodiments are therefore not to be taken as indicative of the limits of the invention but rather as exemplary structures described to illustrate and explain various aspects of the invention.

BRIEF DESCRIPTION OF THE DRAWINGS

FIG. 3C is an example pseudo code and related waveforms for the noise approximation method of FIG. 3B.

FIG. 7 is an example embodiment of an active payload moment dampening system.

DETAILED DESCRIPTION OF THE PREFERRED EMBODIMENTS

The subject invention enables a reduction of noise in an audio signal detected by a UAV acoustic sensor, e.g. a microphone, during flight.

Figure 1:
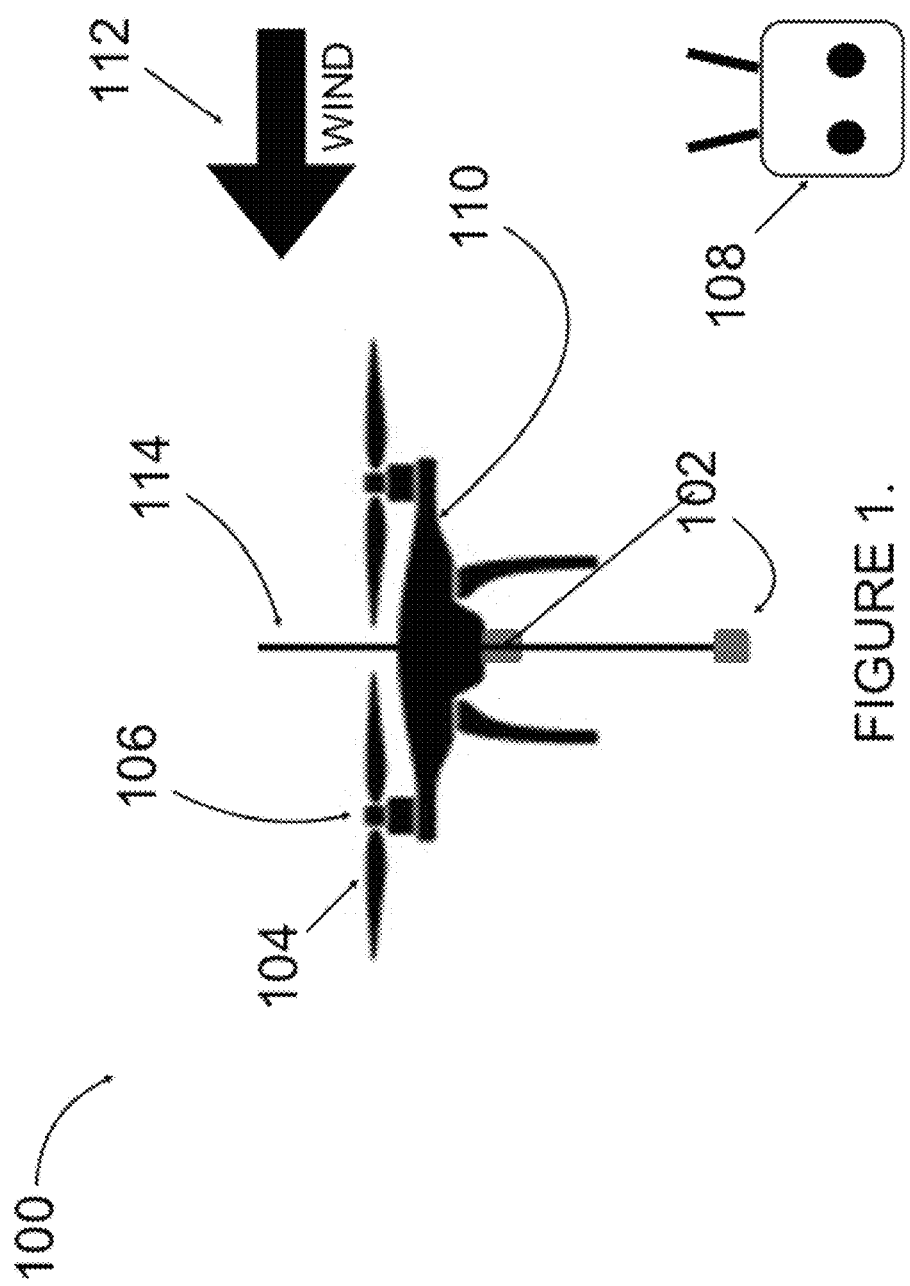
FIG. 1 is a general diagram of a UAV system, showing an example implementation using a microphone which may be extended vertically below the UAV on a boom.

Referring to FIG. 1, a UAV system 100 is comprised of a UAV 110, which is equipped with one or more motors 106, each for rotating a corresponding propeller 104. The system 100 may be piloted remotely by a remote controller 108 or by automated instructions saved in the UAV's flight control system 210 shown in FIG. 2. External environmental factors, such as wind 112, precipitation, and the like, act upon the UAV system 100 and can be accounted for by the UAV's flight control system 210. The flight control system 210 determines the desired action for the UAV 110 based on the current state of the UAV 110 and the external environmental factors, e.g. the wind 112. In a preferred embodiment, the flight control system 210 tracks the UAV's state at any given moment of time. This information may include position, velocity of UAV, rotational speed of propellers, rate of battery discharge, temperature, motor speed(s), velocity vector, positional vector, acceleration vector, orientation, environmental correction factors, and the like. This information may be used to determine an anticipated acoustic signature for each of the equipped propellers 104, motors 106, and any other rotational component, e.g. camera gimbal, as well as the UAV system 100 itself. The UAV 110 may be equipped with one or more acoustic sensors, such as a microphone 102, for capturing sound waveforms representing acoustic signals from the UAV 110 and from other objects as well, such as other UAVs, not shown. In an embodiment, only one microphone 102 is utilized. The microphone 102 may have a pre-determined spatial response pattern, including but not limited to a cardioid pattern, shotgun-style, omnidirectional, or another pattern, as suits the acoustic application. The microphone 102 can be further mounted on an extendable boom 114, as shown in FIG. 1. The boom 114 can be manually, remotely, or automatically extended away from the downwash of the propellers. While FIG. 1 illustrates a downward-extended microphone 102 at the end of the boom 114, upward, sideways and other configurations may also be used. In one embodiment, multiple UAVs 110 may be used, each equipped with a microphone or microphones 102, such that the multiple UAVs 110, to perform the role of a boom 114. Furthermore as will be described in more detail below with reference to FIG. 5, an acoustic shield 510 may be used as part of the boom 114, and may be an integral part of the microphone 102, or the UAV body 110, or both.

Figure 2:
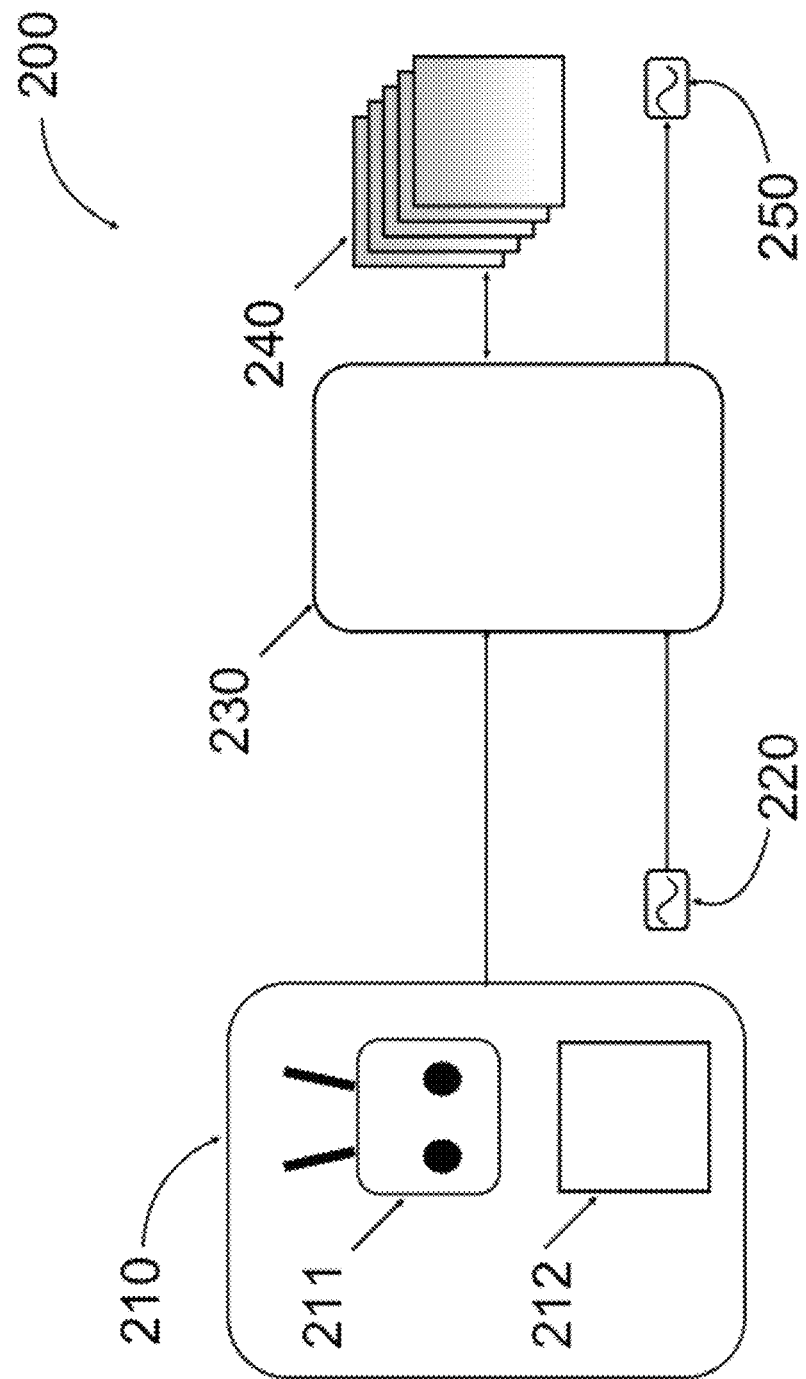
FIG. 2 is a system-level diagram of an adaptive filter apparatus utilizing known noise waveforms and a lookup table based on current flight conditions.

Referring now to FIG. 2, a UAV control apparatus 200 may include a suitable processor and programming stored in non-transitory memory and executable thereby. Pre-determined known acoustic signatures for the particular UAV 110 (or UAVs if there are multiple ones in use) in a given configuration are stored in a database 240. A flight control system 210 determines the flight state based on a flight control input module 211 or a remote pilot along with environmental flight compensation module 212. Environmental factors including wind velocity, humidity, ambient temperature and barometric pressure, may be taken into account by the environmental flight compensation module 212. Programming stored in memory of a processing module 230 of the UAV control system 200 causes a processor of the processing module 230 to receive sound waveforms 220 collected from the microphone(s) 102 of FIG. 1. The processing module 230 further receives flight state, control, and, or environmental data from the flight control system 210, and uses the latter to determine a subset of likely acoustic signatures from the acoustic signature database 240. By way of a non-limiting example, the acoustic signature determination may be based on any one or more of the following: the flight control system 210 driving e.g. four motors 106 (FIG. 1), to rotate e.g. four propellers 104, at a velocity of, e.g. 10 mph, with a wind velocity of, e.g. 5 mph N, at an ambient temperature of, e.g. 20° C., and altitude of, e.g. 200 ft, with a cargo, e.g. a camera, weighing 1 kg, while a camera gimbal rotates the camera.

The processing module 230 receives the flight control data based on one or more of these factors, and other predetermined factors, e.g. UAV model, and computes an approximation of noise in the sound waveforms based on a compilation of stored acoustic signatures for each factor from the acoustic signature database 240. The processing module 230 may then produce an output acoustic waveform 250 including the sound waveform 220 less the approximated acoustic noise identified in acoustic signature database 240 and modified based on parameters derived from the most likely acoustic signature of the acoustic signature database 240. The processing module 230 may be on board the UAV 110, or located remotely. Similarly, the acoustic signature database 240 may be stored locally on the UAV 110 or remotely accessed by the UAV control system 200. The processing module 230 or the databases 240 may be updated manually or automatically. The processing module 230 or the databases 240 may be updated through a memory card, or remotely over a communication link. A remote server performing a wireless Ethernet (Wi-Fi) or cellular packet radio update is an example of such an implementation.

Figure 3A:
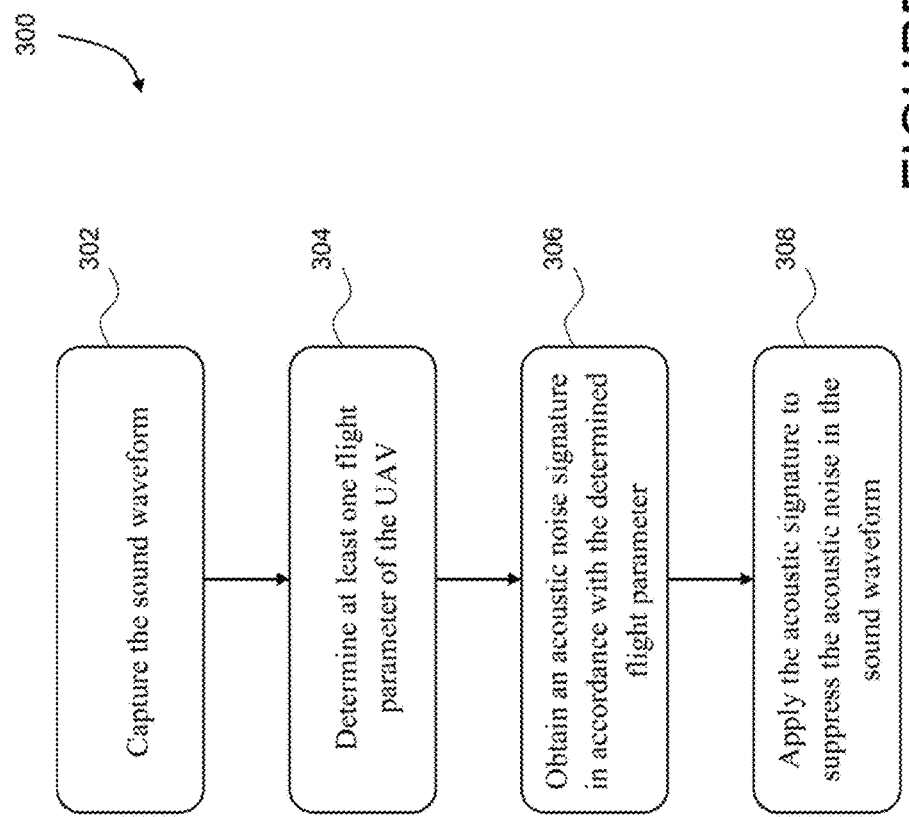
FIG. 3A is a flow chart of a method for UAV noise suppression.

The noise estimation and suppression will now be explained in more detail. Referring to FIG. 3A, an exemplary method 300 for UAV noise suppression is presented. The method 300 includes step 302 of capturing at least one sound waveform a(x), representing the time-varying sound pressure at the given sensor or microphone 102. The voltage or voltages may be within a variety of nominal ranges. Each voltage range may have a given relationship which corresponds to a defined sound pressure range. Each voltage range may be amplified by an amplifier (onboard or remote; not shown) or otherwise altered to enable quantization. A digital signal processor of the processing module 230 (FIG. 2; onboard or remote) accepts the varying voltage from each of the acoustic sensors 102 and produces corresponding digitized waveforms. These digitized waveforms may be stored in transient or non-transient memory onboard, or transmitted remotely, as n-dimensional arrays, with two of the dimensions corresponding to quantization level and time, and thereby form a digital representation of the original analog sound pressure received by each acoustic sensor 102.

In step 304, the relevant flight parameter(s) related to the noise suppression may be determined. The waveforms may be further notated to denote at least one flight parameter corresponding to the flight conditions, such as RPM, joystick positions, etc. from the UAV and/or flight control systems 200 and 210, respectively. The notations may be used to select an analytic method for each signal; the analytic method may seek one or more fundamental frequencies and their harmonic features from each of the digitized sensors 102, the signal of which is represented by the sound waveform a(x).

In step 306, at least one acoustic noise signature f(x), i.e. a time-varying frequency transfer function, is obtained, e.g. retrieved from the database 240 of FIG. 2. The obtained noise signature f(x) is based on the determined flight parameters(s). The function f(x) and its frequency-domain representation f(x') may be defined by parameters obtained from the pre-defined database 240 of FIG. 2 and may also be defined or modified based on an algorithmic function. The input and search criteria for the functions f(x) and f(x') database lookup 240 may be comprised of the following:

a. the key features of a(x) such as its peak and harmonic frequencies, frequency overlaps from multiple noise-generating components, such as motors 106 and propellers 104;
 b. flight state information such as motor RPM, velocity vectors, compensation vectors, etc.;
 c. flight control input positions such as instructions to the flight controller, joystick positions, etc.;
 d. environmental data such as computed or actual wind vectors, relative humidity, temperature, barometric pressure, etc.; and
 e. other higher-order information about the UAV's operation (such as its geographical location) which would give rise to appropriate noise function of the noise-generating components.

In one embodiment, the acoustic noise signature f(x) may include a plurality of noise signature components, each for a particular rotational component, such as a motor or a propeller blade, of the UAV. Each noise signature component may include a plurality of harmonics of the rotation frequency of the corresponding rotational component, e.g. a motor or a propeller blade, a gimbal, etc.

In step 308, the obtained acoustic noise signature is applied to suppress the acoustic noise in the sound waveform. To obtain a better fit of the noise, the acoustic noise signature may be further adjusted or conditioned. By way of a non-limiting example, an initial match may be generated between the sound waveform and the acoustic noise signature, and the initial match may then be analyzed for variations of the sound waveform from the acoustic noise signature. The acoustic noise signature may be modified or adjusted in accordance with the analysis, e.g. acoustic noise signature may be modified based on occurrences of destructive and constructive interference in the sound waveform a(x). Such acoustic noise signature adjustments are intended to account for variations in amplitude, phase, peak-width, peak-profile, zero-crossing, and other time-domain characteristics in a(x), with the purpose of identifying a highest likelihood noise approximating function, f'(x), for a given sound waveform a(x). The UAV noise represented by the noise approximating function f'(x) may then be subtracted from the sound waveform a(x), to provide a noise-suppressed sound waveform a'(x).

Figure 3B:
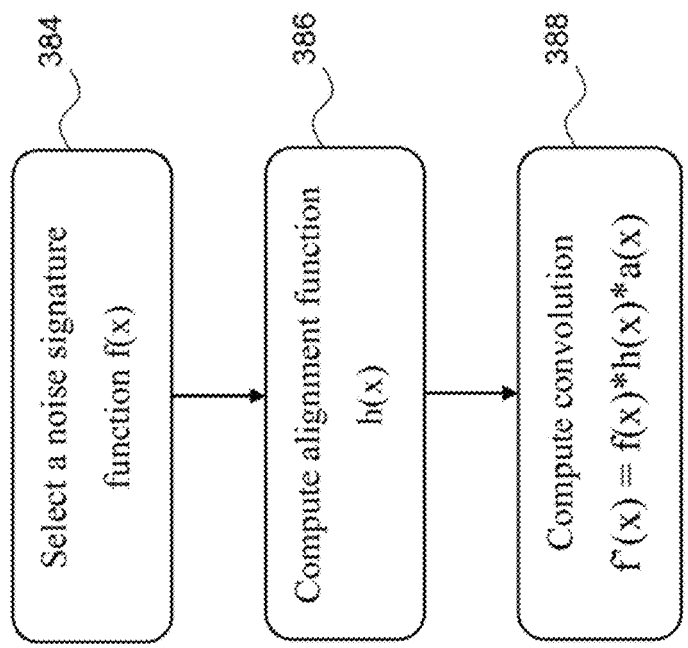
FIG. 3B is a flow chart of UAV noise approximation used in the method of FIG. 3A.

An exemplary embodiment of obtaining and adapting noise signatures to better match noise in the sound waveform a(x) will now be considered. Referring to FIG. 3B, the sound waveform a(x) includes unwanted noise generated from the UAV 110. In step 384, a noise signature f(x) having a corresponding frequency-domain representation f(x') is selected as explained above. In step 386, an alignment function h(x) and its frequency-domain representation h(x') are obtained. The latter may be configured to perform operations in frequency domain using a series of Fast-Fourier Transforms given the parameters obtained in f(x'). Such a function h(x) may use time-domain information to seek the leading edge (phase alignment) of a key feature, e.g. peaks, identified in f(x'), to ensure the maximum alignment of a(x) and a noise approximating function f'(x). In one example, the root and key harmonic frequencies in the sound waveform a(x) are determined, and sound signatures in the signature library are narrowed to the most likely subset of signatures based on the flight parameters. A starting match may be determined and placed in f(x) in step 384. The sound waveform a(x) may be analyzed for variations of a(x) from f(x) in terms of primary parameters of peak width, phase, and expected profile of harmonic amplitudes. The sound waveform a(x) may also be analyzed for variations in secondary parameters, which may include destructive interference, constructive interference, root frequency drift, harmonic frequency drift, and valley frequency patterns. Based on the findings, the transform function, h(x), is obtained in step 386.

In a next step 388, the frequency transfer function f(x) is convoluted with h(x) and the sound waveform a(x) to produce the noise approximating function f'(x) according to $$f'(x) = f(x) * h(x) * a(x) \tag{1}$$

The noise approximating function f'(x) may then be subtracted from the sound waveform a(x) to obtain the noise-suppressed sound waveform a'(x) in accordance with $$a'(x)=a(x)-f'(x) \quad (2)$$

The waveforms and functions f(x), h(x), a(x), and f'(x) of Eq. (1) are illustrated in FIG. 3C.

Figure 3D:
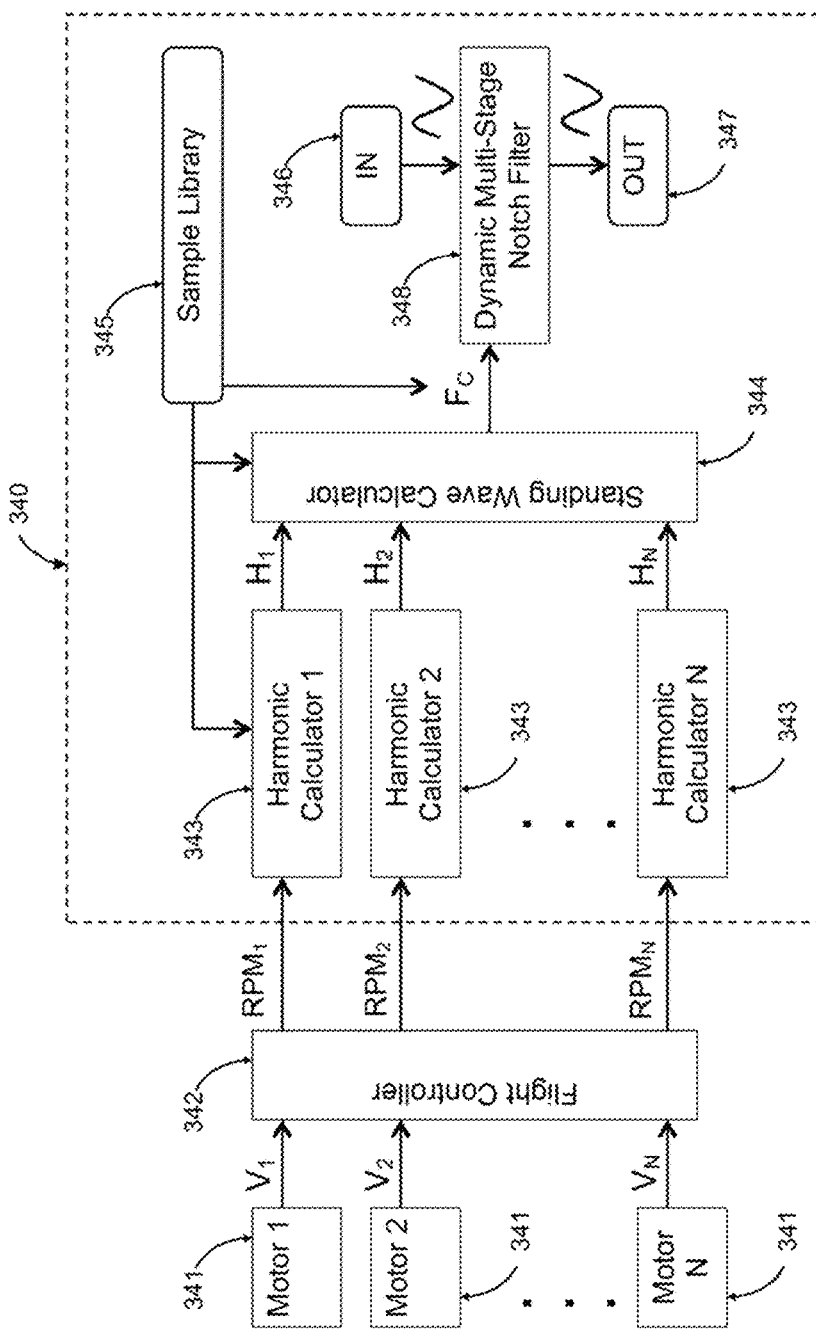
FIG. 3D is an exemplary system diagram for UAV noise suppression.

Referring now to FIG. 3D, a system 340 for UAV noise suppression suppresses the UAV noise according to the techniques described in FIGS. 3A, 3B, and 3C above. The system 340 includes harmonic calculators 343, a standing wave calculator 344, a sample library 345 corresponding to the acoustic signature database 240 of FIG. 2, and a dynamic multi-stage notch filter 348. The system 340 can be implemented in software, hardware, or a combination of both.

In this example, the system 340 makes use of motors 341 voltage sensors to determine individual motor RPM data and thereby determine the anticipated noise harmonic frequencies. A flight controller 342, operably coupled to the N motors 341, determines current rotation frequencies $RPM_1 \ldots RPM_N$, which are communicated to the harmonic calculators 343. The anticipated harmonic frequencies are matched against the UAV signature library, that is, the sample library 345, to determine harmonic signatures $H_1 \ldots H_N$. Each harmonic signature $H_1 \ldots H_N$ may include frequency, bandwidth, and amplitude values. This information is then used by the standing wave calculator 344 to calculate the interference pattern. The interference pattern comprises variations in individual harmonics to account for constructive and destructive interference, frequency drift, frequency spreading, and ultimately the parameters which define the convolution function represented by the dynamic multi-stage notch filter 348. The output (OUT) of this process is a self-noise-reduced acoustic signal representation 347 of the original acoustic input (IN) signal 346.

It will be understood by those skilled in the art that the above representation of a real-time embodiment of the present invention can be easily extended to include non-real-time embodiments and signal acquisition from other means, wherein the processes of signal acquisition and signal manipulation can be separated in time and space. The digitized signal may be stored in a variety of formats to reduce memory or computing resources. These include, but are not limited to, WAV, MP3, AAC, AIFF, PCM, and other proprietary and non-proprietary formats.

Figure 4A:
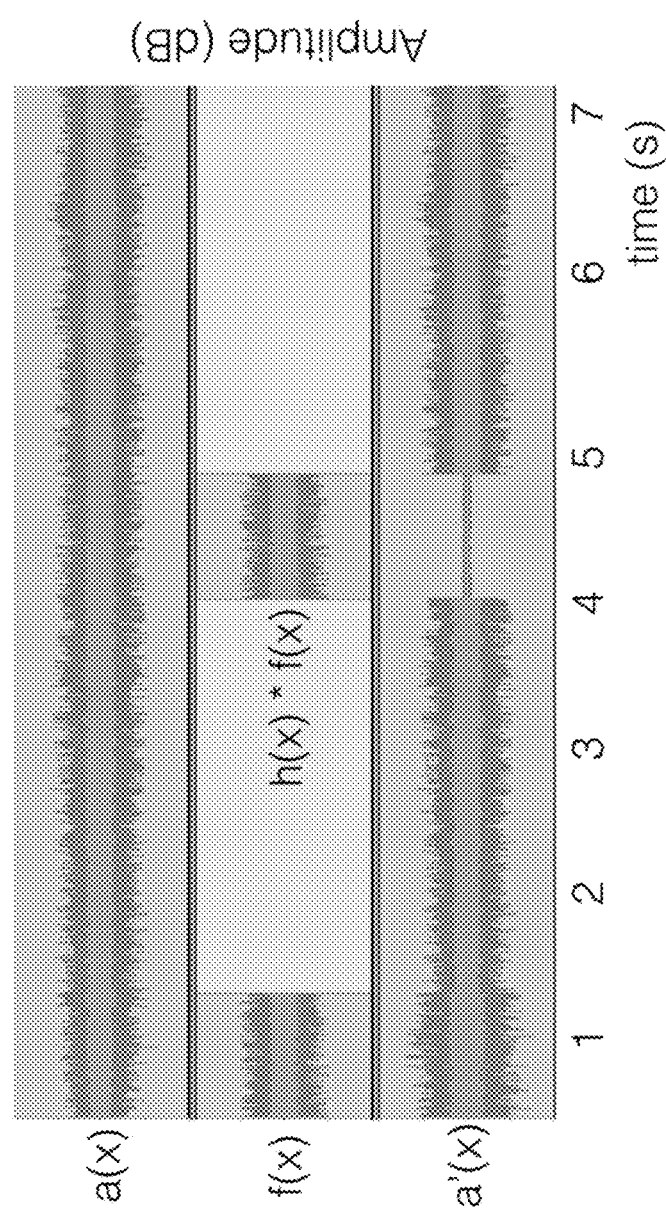
FIG. 4A is a demonstration of noise suppression achieved by the method of FIGS. 3B and 3C.

FIG. 4A depicts experimental results 400 on an arbitrary UAV noise signal, a(x), illustrated as a voltage signal of dB vs. time with the noise reduction algorithm applied, i.e. the addition of f(x) between 4 s and 5 s of the signal to produce a clean acoustic output signal a'(x) during that time.

Figure 4B:
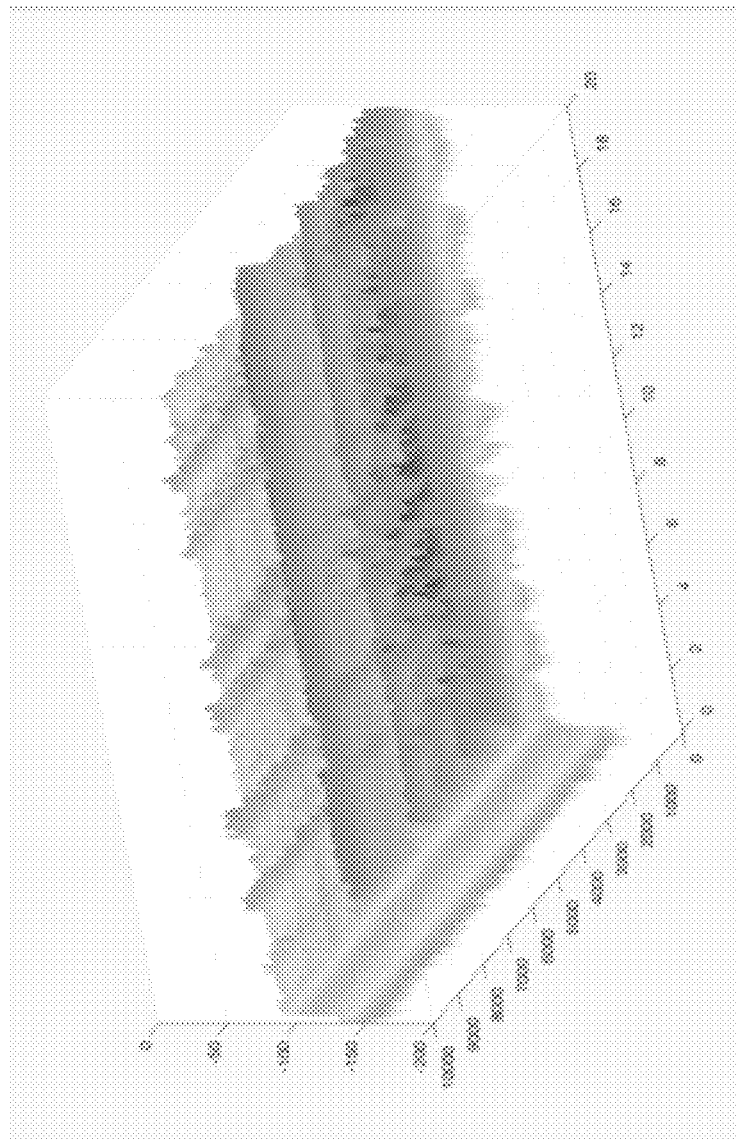
FIGS. 4B and 4C are a time-dependent frequency characteristics of the sound waveform a(x) before and after noise suppression, respectively.
Figure 4C:
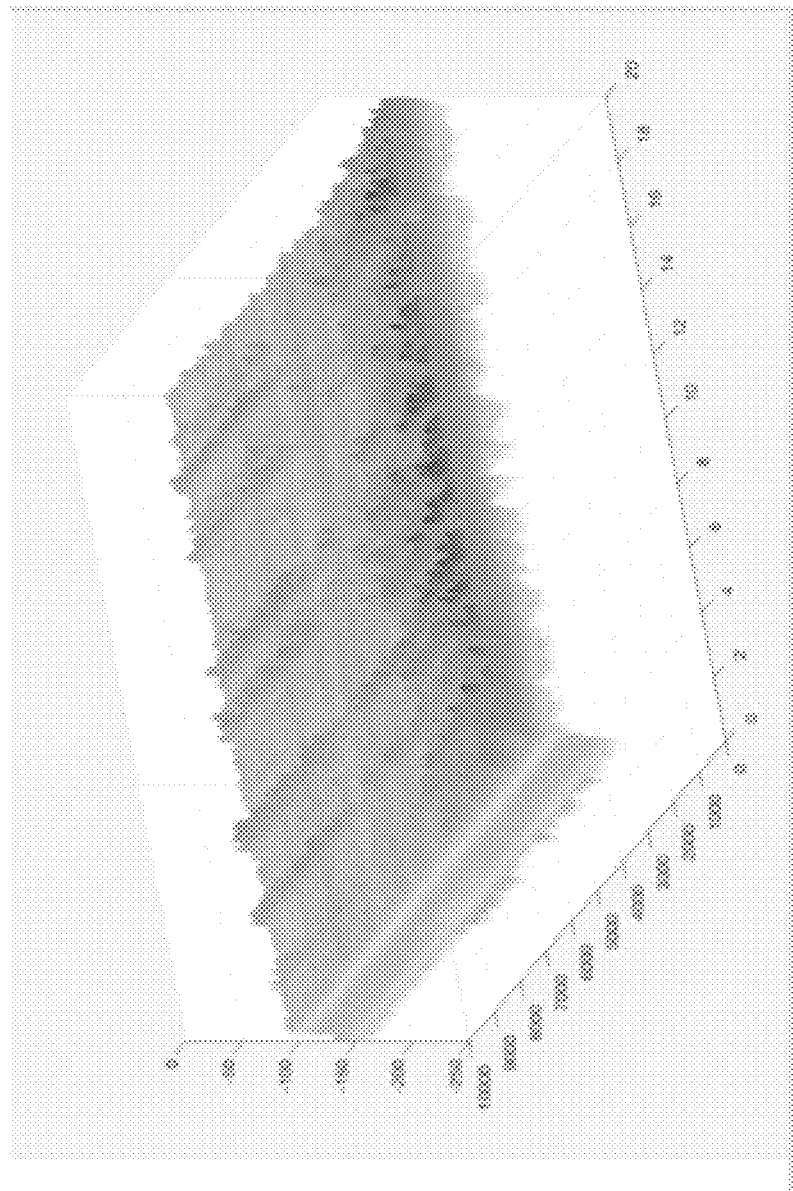

FIGS. 4B and 4C illustrate time evolution of sound spectra before and after noise suppression. In FIGS. 4B and 4C, the left horizontal scale depicts sound frequency in Hz, the vertical scale depicts signal strength in dB, and the right horizontal scale depicts time in seconds. FIG. 4B shows a time dependence of a frequency spectrum of the sound waveform a(x) before suppression, showing some time-varying harmonics at approximately 775 Hz, 1.55 kHz, 3.1 kHz, and 6.2 kHz. FIG. 4C shows a time dependence of a frequency spectrum of the noise-suppressed sound waveform a'(x). One can see by comparing FIGS. 4B and 4C that noise harmonics have been considerably suppressed, especially the highest harmonics at 6.2 kHz and 3.1 kHz. Notably, noise suppression can be achieved either by phase-shifting a sample waveform or by dynamically "erasing" harmonic lines through a narrowband notch filter, or by a combination of the two.

Figure 5:
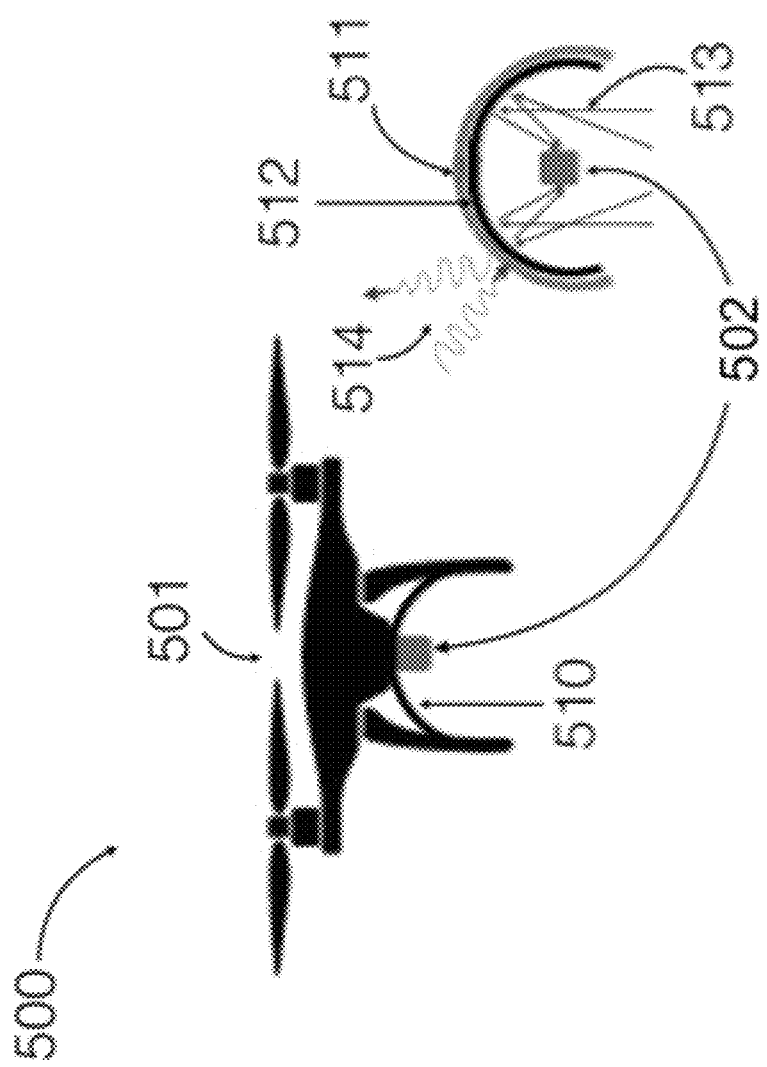
FIG. 5 is an example embodiment of an acoustic shield.

Referring to FIG. 5, a UAV system 500 uses an acoustic shield 510, which may be in a variety of form factors, mounted to the underside of a given UAV 501 similar to UAV 110 of FIG. 1. The preferred embodiment is a parabolic guard 512 (FIG. 5), which is coated with a lightweight sound absorbing material 511. The sound absorbing material 511 is selected and configured to ensure maximum signal absorption and extraneous reflections 514 away from an embedded sound sensor 502, while the interior of the guard 512 is designed with high sound reflecting material as to direct signals of interest towards 513 the sound sensor 502. It will be understood by those skilled in the art that the shield 510 may be of various geometries and dimensions and is not limited to the shapes and relative sizes disclosed herein. The presence of a noise shield 510, if so equipped, modifies the time- and frequency-dependent coefficients of the transform function, h(x), which may require a different or expanded signature library 240.

Figure 6:
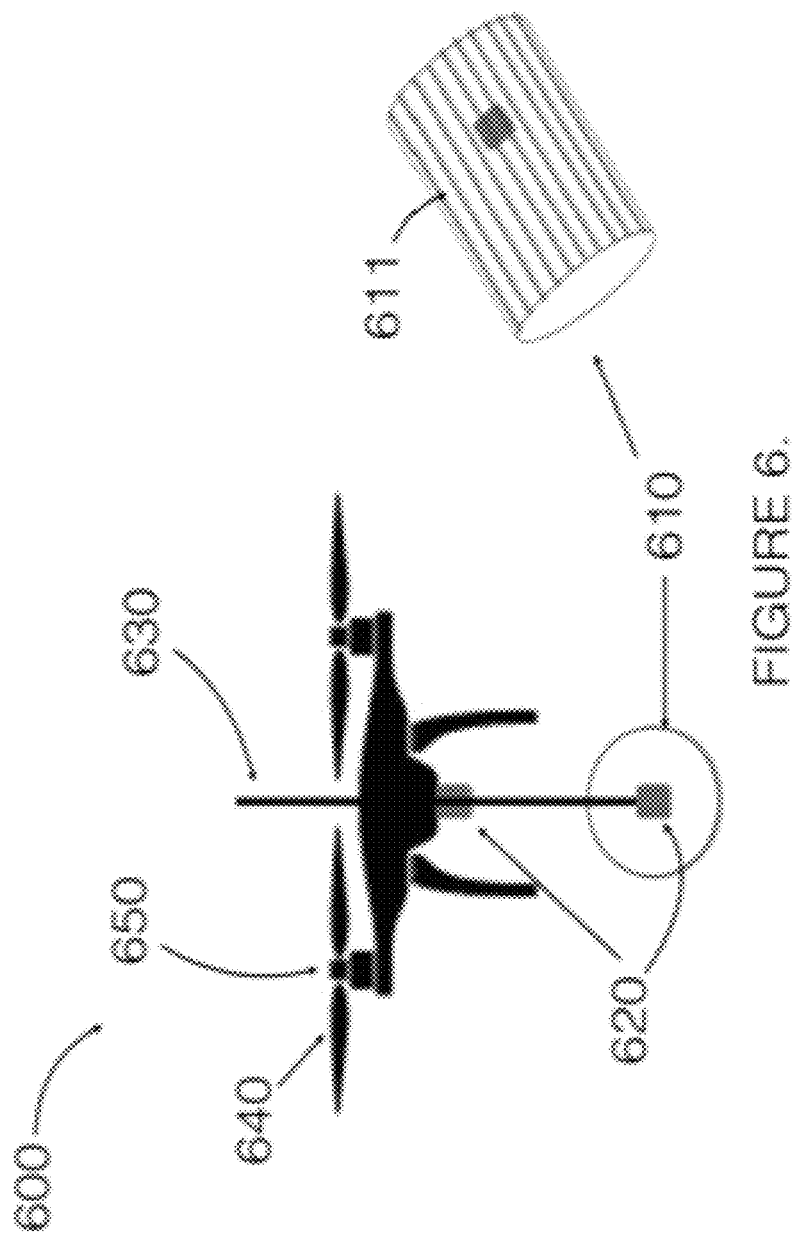
FIG. 6 is an example embodiment of a single extendable boom with an acoustic shield.

Referring to FIG. 6, a UAV 600 uses a boom 630 fixed to the UAV's 600 geometrical center of gravity. The boom 630 extends in the vertical plane so as to enable a sound sensor 620 to be moved closer to a target of interest. In a self-noise reduction application, the sensor 620 is moved away from the primary noise path created from various components of the UAV 600, such as propellers 640 and motors 650. An acoustic shield 610 may be attached to the boom 630 and the sound sensor 620 system to enable acoustic dampening and enhanced beam-forming by extending intra-sensor distances. The boom 630 may be at a fixed length, or it may be at a plurality of lengths, including 1 cm, 10 cm, 100 cm, 1000 cm and values between, below, or beyond these ranges. A plurality of geometries are possible for the acoustic shield 610 including cubic, cylindrical, parabolic, spherical, and complex shapes. A plurality of acoustic dampening and reflecting materials and material shapes 611 may be provided. One embodiment includes an acoustic foam shaped into triangular wedges and offset in distances and angles as to maximally absorb and reflect desired frequency ranges away from the acoustic sensor 620.

The boom 630 enables a variety of new applications that extend the range of the UAV sensor and payload. The UAV 600 can be flown at a safe altitude, for example at an altitude amenable to maintaining a direct line of sight for reliable remote wireless control, while the payload itself can be lowered to a desired position. As small UAVs are very sensitive to weight and balance configurations, an active moment-dampening system may be used to reduce payload oscillations.

FIG. 7 shows a UAV system 700 including a UAV 710 with an extendable boom comprised of a plurality of extension cables 720. The number of cables can be 1, 2, 3, 4, or more depending on the type of control system desired, weight, power consumption, and other considerations. In this example, a 4-cable boom is demonstrated, wherein each cable 720 is attached to a corresponding motor 730. The motor 730 is shown attached to the landing gear of the UAV [710], however, it is to be understood that the motors 730 can be placed at a plurality of locations, including on the cables themselves, on the shield 740, and on other parts of the UAV 710. The motors 730 may be under the control of the UAV's onboard flight controller, or controlled remotely. The motors 730 may be controlled automatically or manually. The motor control system, not shown, may communicate with a remote controller over the UAV's existing control link, or it may have its own control link. The motor control system may use the UAV on-board power system, or it may have its own power system. An active dampening system may be enabled on the motor control system to compensate for adverse flight characteristics of a sensor payload system, including the shield 740, being at a significant arm from the UAV's normal center of gravity datum. A moment-compensator may be utilized. The moment-compensator may dynamically adjust the length of each equipped cable 720 in response to adverse events. The system can also be used to provide a stability of the payload position, wherein the UAV 710 is positioned and the cable lengths 720 individually adjusted, to ensure the payload-sensor system 740 remains stationary in 3-dimensional space.

It will be understood by those skilled in the art that a system of the present disclosure enables sensors to be utilized on UAVs that were not previously possible or practical. For example, in addition to an acoustic sensor, this system enables the use of an acoustic speaker for two-way communication. Similarly, in applications such as magnetic sensing, a sensitive magnetometer may be moved out of the UAV magnetic field. In applications where UAVs cannot easily penetrate (such as a collapsed building or forest fire), the boom enables accurate insertion of emergency equipment (a two-way radio, a defibrillator, etc.). For delivery services, the boom enables the UAV to maintain active data link control (at altitude) while delivering a package.

An application for the present invention includes a UAV-mounted boom microphone and directional RF sensor that can be physically and digitally removed from the primary self-noise path and focused on the target of interest.

The application provides the UAV boom mounting system (hardware) and control system software that uses flight characteristics obtained from the UAV's flight control system to dynamically adjust the digital acoustic filter characteristics. A variable comb filter can be provided that uses the RPM (or even its abstraction as control inputs) to adjust the comb widths and center frequencies based on the resonant frequencies of the noise-making components (motors, propellers).

One embodiment of the present disclosure is primarily a hardware product employing a boom-mounted shotgun microphone, an acoustic shield, a boom extension/retraction mechanism, a wireless remote audio streaming and control protocol, and a "base station" receiver/controller. Noise cancellation is done in a post-processing software application. Another embodiment of the present disclosure builds on the hardware product and includes active noise cancellation processing on board. This is both a hardware and software solution.

What is claimed is:

1. A method for suppressing noise comprising:
    obtaining a sound waveform corresponding to an acoustic signal captured by an unmanned aerial vehicle (UAV)-mounted acoustic sensor during flight;
    determining at least one flight parameter of the UAV;
    obtaining an acoustic noise signature waveform in accordance with the at least one flight parameter from a database of acoustic signatures for flight parameters;
    generating an initial match between the sound waveform and the acoustic noise signature waveform;
    analyzing the initial match for variations of phase between the acoustic noise signature waveform and the sound waveform by determining offsets of edge positions of peaks in the acoustic noise signature waveform from edge positions of corresponding peaks in the sound waveform;
    modifying the acoustic noise signature waveform to reduce the variations of phase to obtain a noise approximation waveform; and
    subtracting the noise approximation waveform from the sound waveform.

2. The method according to claim 1, further comprising analyzing the initial match for variations of at least one of width or profile of harmonic amplitudes.

3. The method according to claim 1, wherein the modifying comprises adjusting the acoustic noise signature waveform based on occurrences of destructive and constructive interference in the sound waveform.

4. The method according to claim 1, wherein the modifying comprises:
    generating an alignment function for aligning the acoustic noise signature waveform in time domain to obtain a time-aligned acoustic noise signature waveform; and
    multiplying amplitudes of a Fourier transform of the sound waveform by a Fourier transform of the time-aligned acoustic noise signature waveform to obtain the noise approximation waveform.

5. The method according to claim 1, wherein the determining comprises obtaining at least one flight parameter from a flight control system of the UAV.

6. The method according to claim 1, wherein the at least one flight parameter comprises a physical configuration parameter including a type of rotational components of the UAV, the type of rotational components comprising a motor, a propeller blade, or a gimbal, and rotation frequency of each rotational component.

7. The method according to claim 6, wherein the acoustic noise signature waveform comprises a noise signature component for each rotational component, wherein each noise signature component comprises a plurality of harmonics of the rotation frequency of corresponding rotational component.

8. The method according to claim 1, wherein the determining comprises determining at least one of: a velocity vector of the UAV, a positional vector of the UAV, or an acceleration vector of the UAV.

9. The method according to claim 1, wherein the determining comprises determining at least one environmental parameter.

10. The method according to claim 9, wherein the at least one environmental parameter comprises at least one of wind velocity, humidity, temperature, or barometric pressure.

11. The method according to claim 1, further comprising providing an acoustic shield between the UAV and the acoustic sensor.

12. An apparatus for suppressing noise comprising:
    an acoustic sensor for mounting on an unmanned aerial vehicle (UAV);
    a processor; and
    a computer readable non-transitory storage medium storing programming for execution by the processor, the programming including instructions for:
    obtaining a sound waveform corresponding to an acoustic signal captured by the UAV-mounted acoustic sensor during flight;
    determining at least one flight parameter of the UAV;
    obtaining an acoustic noise signature waveform in accordance with the at least one flight parameter from a database of acoustic signatures for flight parameters;
    generating an initial match between the sound waveform and the acoustic noise signature waveform;
    analyzing the initial match for variations of phase between the acoustic noise signature waveform and the sound waveform by determining offsets of edge positions of peaks in the acoustic noise signature waveform from edge positions of corresponding peaks in the sound waveform;

modifying the acoustic noise signature waveform to reduce the variations of phase to obtain a noise approximation waveform; and subtracting the noise approximation waveform from the sound waveform.

13. The apparatus according to claim 12, further comprising an acoustic shield for mounting between the UAV and the acoustic sensor.

14. The apparatus according to claim 12, further comprising a boom for positioning the acoustic sensor remote from the UAV.

15. An unmanned aerial vehicle (UAV) comprising:

a body;

one or more rotational components each comprising a propeller for propelling the body through air;

a flight controller for controlling the one or more rotational components based on flight parameters;

an acoustic sensor for capturing an acoustic signal; and a noise reduction processing unit configured for:

receiving a sound waveform corresponding to the acoustic signal captured by the acoustic sensor;

determining at least one flight parameter of the UAV;

obtaining an acoustic noise signature waveform in accordance with the at least one flight parameter from a database of acoustic signatures for flight parameters;

generating an initial match between the sound waveform and the acoustic noise signature waveform;

analyzing the initial match for variations of phase between the acoustic noise signature waveform and the sound waveform by determining offsets of edge positions of peaks in the acoustic noise signature waveform from edge positions of corresponding peaks in the sound waveform;

modifying the acoustic noise signature waveform to reduce the variations of phase to obtain a noise approximation waveform; and subtracting the noise approximation waveform from the sound waveform.

16. The UAV according to claim 15, further comprising an acoustic shield between the one or more rotational components and the acoustic sensor.

17. The UAV according to claim 15, further comprising:

a boom for positioning the acoustic sensor remote from the body; and an acoustic shield on an outer free end of the boom disposed between the one or more rotational components and the acoustic sensor.

18. The UAV according to claim 17, wherein the boom is extendable from the body.

* * * * *